(12) United States Patent
Hung et al.

(10) Patent No.: US 7,695,705 B2
(45) Date of Patent: Apr. 13, 2010

(54) METHOD AND APPARATUS FOR THE PRODUCTION OF ULTRAFINE SILICA PARTICLES FROM SOLID SILICA POWDER AND RELATED COATING COMPOSITIONS

(75) Inventors: Cheng-Hung Hung, Wexford, PA (US); Noel R. Vanier, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 595 days.

(21) Appl. No.: 11/465,560

(22) Filed: Aug. 18, 2006

(65) Prior Publication Data

US 2007/0048206 A1  Mar. 1, 2007

Related U.S. Application Data

(60) Provisional application No. 60/711,723, filed on Aug. 26, 2005.

(51) Int. Cl.
*C01B 33/12* (2006.01)
*C04B 14/04* (2006.01)
*B01D 7/00* (2006.01)

(52) U.S. Cl. .................. 423/335; 106/482; 106/488; 422/244; 23/193

(58) Field of Classification Search ................ 423/492; 23/193; 106/482, 488; 422/244
See application file for complete search history.

(56) References Cited

U.S. PATENT DOCUMENTS

| | | | |
|---|---|---|---|
| 3,533,756 A | 10/1970 | Houseman | 23/294 |
| 3,558,337 A * | 1/1971 | Barnes | 106/482 |
| 4,335,080 A * | 6/1982 | Davis et al. | 422/244 |
| 5,749,937 A | 5/1998 | Detering et al. | 75/10.19 |
| 5,788,738 A | 8/1998 | Pirzada et al. | 75/331 |
| 5,851,507 A | 12/1998 | Pirzada et al. | 423/659 |
| 5,935,293 A | 8/1999 | Detering et al. | 75/10.19 |
| 5,984,997 A | 11/1999 | Bickmore et al. | 75/343 |
| RE37,853 E | 9/2002 | Detering et al. | 75/10.19 |
| 6,569,397 B1 | 5/2003 | Yadav et al. | 423/345 |
| 6,669,823 B1 | 12/2003 | Sarkas et al. | 204/164 |
| 6,830,822 B2 | 12/2004 | Yadav | 428/552 |
| 2001/0039766 A1 * | 11/2001 | Hattori et al. | 51/308 |
| 2004/0156986 A1 | 8/2004 | Yadav | 427/180 |

FOREIGN PATENT DOCUMENTS

| | | |
|---|---|---|
| GB | 1 211 703 | 11/1970 |
| GB | 1 286 952 | 8/1972 |
| WO | 03/070839 A1 | 8/2003 |
| WO | 2005/082520 A1 | 9/2005 |

OTHER PUBLICATIONS

"Generation and Behavior of Fine Particles in Thermal Plasmas—A Review" by R. M. Young et al., Plasma Chemistry and Plasma Processing, vol. 5, No. 1 (1985), pp. 1-37.

"Plasma Torch Preparation of High Purity, Low OH Content Fused Silica" by Kurt Nassau et al., Ceramic Bulletin, vol. 54, No. 11 (1975), pp. 1004-1009.

"Thermal Plasma Production of Fumed Silica: The Effect of Quench Conditions on Thickening and Thixotropic Ability" by T. Addona et al., The Canadian Journal of Chemical Engineering, vol. 72, Jun. 1994, pp. 476-483.

* cited by examiner

*Primary Examiner*—Anthony J Green
*Assistant Examiner*—Pegah Parvini
(74) *Attorney, Agent, or Firm*—Donald R. Palladino

(57) ABSTRACT

Disclosed are methods for making ultrafine silica particles in a plasma system, apparatus for making ultrafine silica particles, and coating compositions comprising ultrafine silica particles made by such methods and/or apparatus.

10 Claims, 5 Drawing Sheets

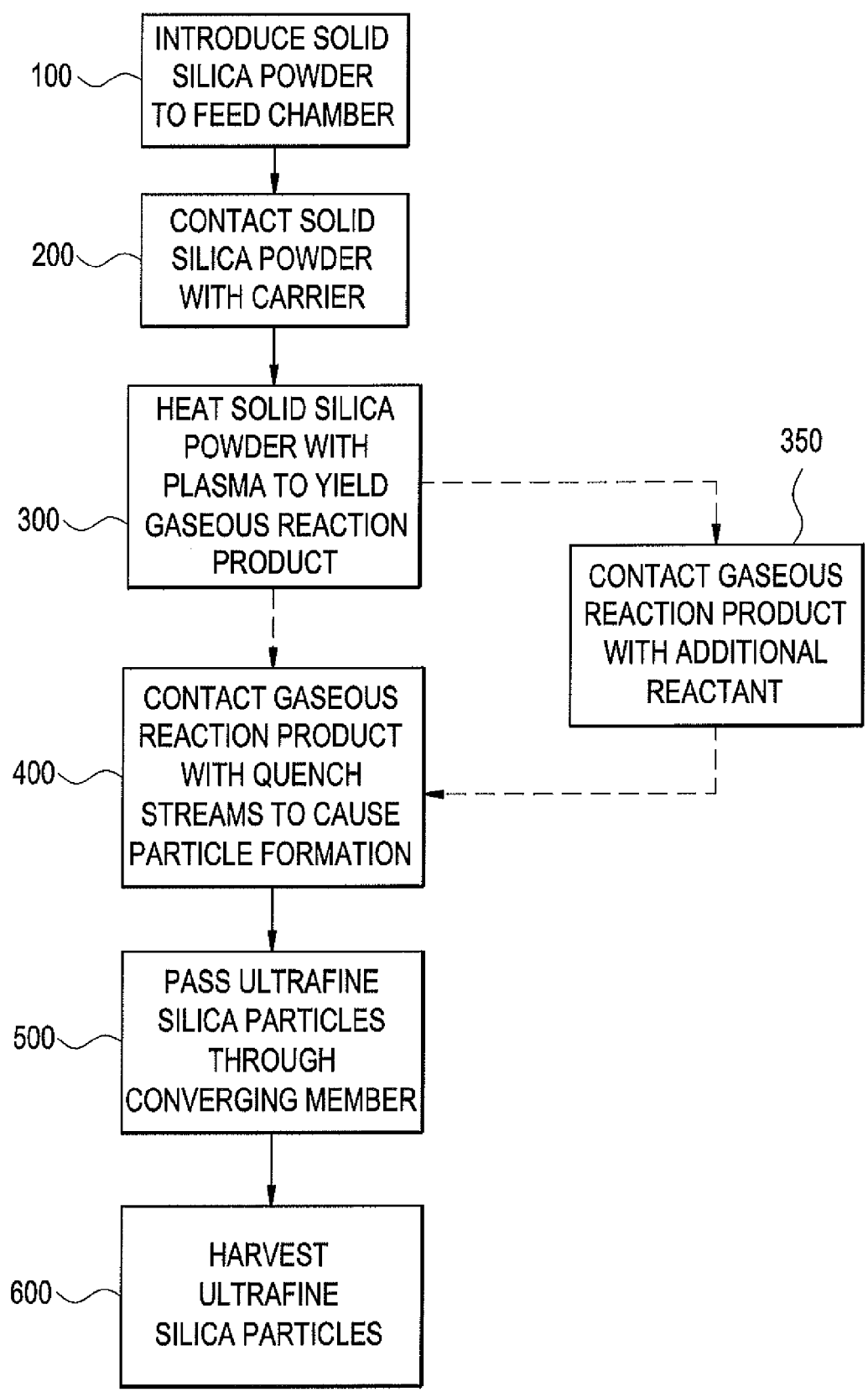

METHOD AND APPARATUS FOR THE PRODUCTION OF ULTRAFINE SILICA PARTICLES FROM SOLID SILICA POWDER AND RELATED COATING COMPOSITIONS

CROSS-REFERENCE TO RELATED APPLICATIONS

This application claims the benefit of U.S. Provisional Patent Application Ser. No. 60/711,723, filed Aug. 26, 2005, which is incorporated by reference herein in its entirety.

FIELD OF THE INVENTION

The present invention relates to methods and apparatus for the production of ultrafine silica particles from solid silica powder. The present invention also relates to ultrafine silica particles and coating compositions comprising such ultrafine silica particles.

BACKGROUND OF THE INVENTION

Fumed silica is often used in coating compositions. The presence of isolated hydroxyl groups on the surface of fumed silica particles often provide desirable Theological properties, such as thixotropy, viscosity, and sag resistance, to coating compositions, such as compositions in the form of aqueous dispersions. Coating compositions in the form of aqueous dispersions are desirable in many applications because they often alleviate some of the environmental hazards associated with organic solvent based coating compositions.

Fumed silica is widely available commercially. Exemplary products include CAB-O-SIL® untreated amorphous fumed silica, commercially available from Cabot Corp., and Aerosil® fumed silica, commercially available from Degussa AG. The term "fumed silica" refers to materials manufactured by high temperature hydrolysis of a volatile silane compound, such as a chlorosilane, in a hydrogen/oxygen flame.

One disadvantage associated with existing commercial processes for manufacturing fumed silica is that they utilize, as indicated, liquid volatile silane materials. These compounds can be relatively expensive as compared to readily available solid silica powders, such as silica flour, silica fume and even synthetic precipitated silica. As a result, it would be advantageous to provide a commercially viable process and/or apparatus for the production of ultrafine silica particles from solid silica powders. Moreover, it would be desirable to provide ultrafine silica particles produced from solid silica powders that exhibit rheology properties similar to fumed silica particles, such that the ultrafine silica particles can effectively at least partially replace fumed silica particles in coating compositions.

SUMMARY OF THE INVENTION

In certain respects, the present invention is directed to methods for making ultrafine silica particles. These methods comprise: (a) introducing a solid silica powder into a plasma chamber; (b) heating the powder by means of a plasma as the powder flows through the plasma chamber, yielding a gaseous product stream; (c) contacting the gaseous product stream with a plurality of quench streams injected into the plasma chamber through a plurality of quench stream injection ports, wherein the quench streams are injected at flow rates and injection angles that result in the impingement of the quench streams with each other within the gaseous product stream, thereby producing ultrafine silica particles; (d) passing the ultrafine silica particles through a converging member; and (e) collecting the ultrafine silica particles.

In some respects, the present invention is directed to methods for making ultrafine silica particles, wherein the methods comprise: (a) introducing a solid silica powder into a plasma chamber; (b) heating the powder by means of a plasma as the powder flows through the plasma chamber, yielding a gaseous product stream; (c) passing the gaseous product stream through a converging member, then (d) contacting the gaseous product stream with a plurality of quench streams injected into the plasma chamber through a plurality of quench stream injection ports, wherein the quench streams are injected at flow rates and injection angles that result in the impingement of the quench streams with each other within the gaseous product stream, thereby producing ultrafine silica particles; and (e) collecting the ultrafine silica particles.

In other respects, the present invention is directed to an apparatus for the production of ultrafine silica particles. The apparatus comprises: (a) a plasma chamber having axially spaced inlet and outlet ends; (b) a high temperature plasma positioned at the inlet end of the plasma chamber; (c) a solid silica powder inlet for introducing solid silica powder to the plasma chamber where the powder is heated by the plasma to produce a gaseous product stream flowing toward the outlet end of the plasma chamber; (d) a converging member located coaxially within the outlet end of the plasma chamber; and (e) a plurality of quench stream injection ports located downstream and/or upstream of the converging member, through which a plurality of quench streams are injected into the plasma chamber at flow rates and injection angles that result in the impingement of the quench streams with each other at or near the center of the gaseous product stream, thereby producing ultrafine silica particles.

The present invention also relates to ultrafine silica particles as well as coating compositions comprising such particles.

BRIEF DESCRIPTION OF THE DRAWINGS

FIGS. 1A and 1B are flowcharts depicted the steps of certain methods of the present invention;

DETAILED DESCRIPTION OF EMBODIMENTS OF THE INVENTION

Figure 1B:
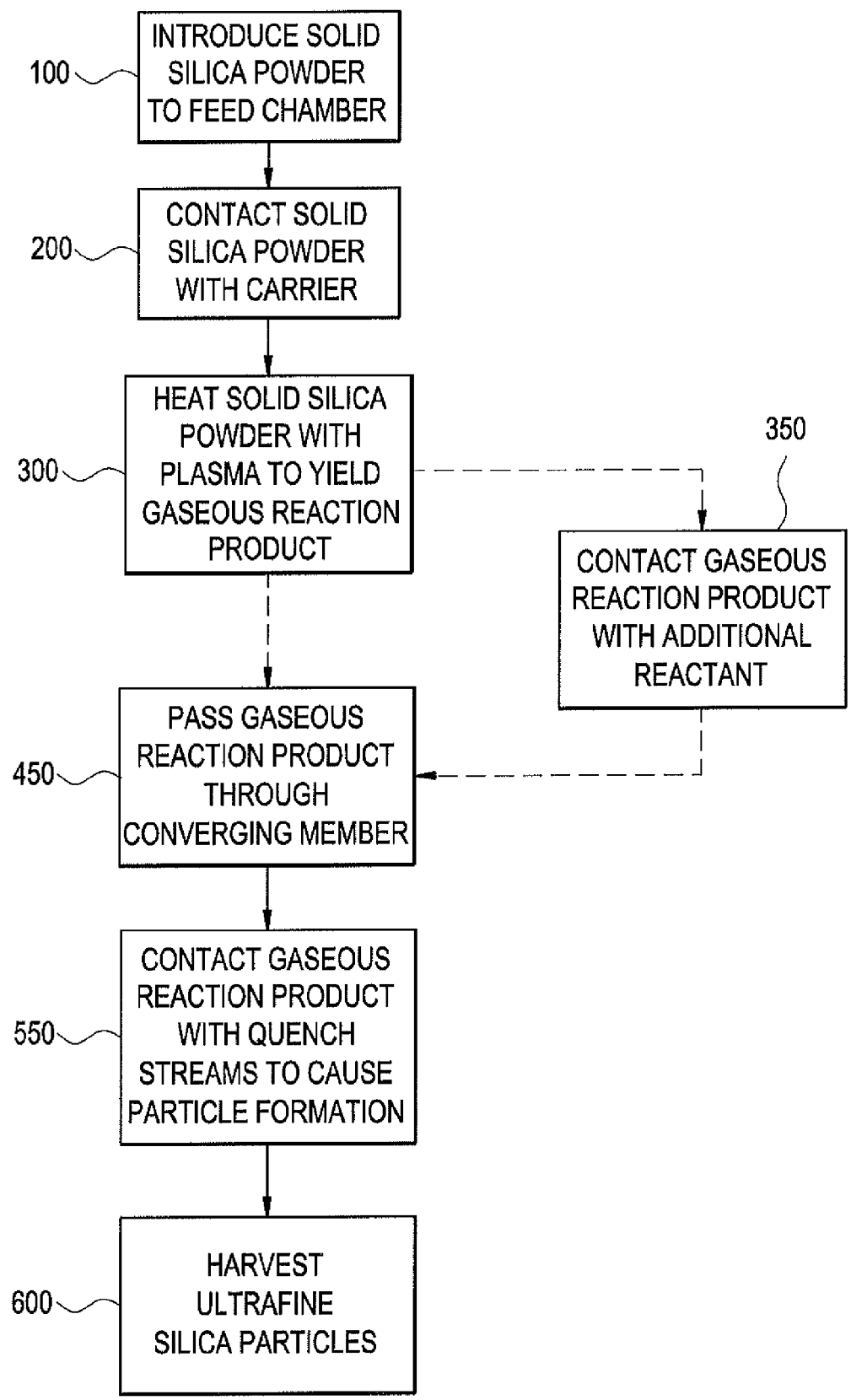

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, certain embodiments of the present invention are directed to methods and/or apparatus for making ultrafine silica particles. As used herein, the term "ultrafine silica particles" refers to silica particles having a B.E.T. specific surface area of at least 10 square meters per gram, such as 30 to 500 square meters per gram, or, in some cases, 90 to 500 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

In certain embodiments, the ultrafine silica particles made in accordance with the present invention have a calculated equivalent spherical diameter of no more than 200 nanometers, such as no more than 100 nanometers, or, in certain embodiments, 5 to 50 nanometers. As will be understood by those skilled in the art, a calculated equivalent spherical diameter can be determined from the B.E.T. specific surface area according to the following equation:

$$\text{Diameter (nanometers)} = 6000/[BET(m^2/g) * \rho(\text{grams}/cm^3)]$$

In certain embodiments, the ultrafine silica particles have an average primary particle size of no more than 100 nanometers, in some cases, no more than 50 nanometers or, in yet other cases, no more than 30 nanometers or, in other cases, no more than 10 nanometers. As used herein, the term "primary particle size" refers to a particle size as determined by visually examining a micrograph of a transmission electron microscopy ("TEM") image, measuring the diameter of the particles in the image, and calculating the average primary particle size of the measured particles based on magnification of the TEM image. One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle as opposed to an agglomeration of two or more individual particles.

In certain embodiments, the present invention is directed to methods and/or apparatus for making ultrafine silica particles that have isolated hydroxyl groups on the particle surface such that a Fourier Transform Infrared Spectroscopy ("FTIR") analysis of the particle shows peaks at the isolated hydroxyl group (SiOH) wave number, which is 3740 cm$^{-1}$, that is at least as large as, in some case larger than, the peak, if any, shown at the adjacent hydroxyl group (hydrogen-bound SiOH, i.e., SiOH(H)) wave number, which is 3530 cm$^{-1}$. In other words, the ratio of the size of the peak at the isolated hydroxyl group wave number to the size of the peak at the adjacent hydroxyl group wave number is at least 1, in some cases it is >1. As a result, like fumed silica and unlike precipitated silica (as discussed below) the ultrafine silica particles produced in accordance with certain embodiments of the present invention, when incorporated into fluids, tend to have a relatively strong particle to particle interaction due to hydrogen-hydrogen bonding of the isolated hydroxyl groups, unlike precipitated silica which has few, if any, isolated hydroxyl groups thereby rendering hydrogen bonding much weaker. Thus, certain embodiments of the present invention are directed to methods and/or apparatus for making ultrafine silica particles that exhibit rheology properties similar to fumed silica.

Referring now to FIGS. 1A and 1B, there are seen flow diagrams depicting certain embodiments of the methods of the present invention. As is apparent, certain embodiments of the present invention are directed to methods of making ultrafine silica particles in a plasma system wherein, at step 100, a solid silica powder is introduced into a feed chamber. As used herein, the term "solid silica powder" refers to any solid silica particles including, for example, those having an average particle diameter of from 1 micron to 10 millimeters. Examples of such materials include silica flour, silica sand, and silica fume (amorphous silica derived from the smoke produced in electric furnaces that produce silicon metal and alloys).

In certain embodiments of the present invention, the solid silica powder comprises precipitated silica. As used herein, the term "precipitated silica" refers to silica produced from an acid-precipitation of an aqueous solution of an alkaline silicate, which results in the formation of distinct agglomerates based on primary particles, wherein the agglomerates have an average size of at least 1 micron, in some cases at least 5 microns. Examples of such materials include commercially available products, such as Hi-Sil® WB-10 and Hi-Sil® T600 (which has a B.E.T. specific surface area of 150 m$^2$/g and a median agglomerate diameter of 20 microns), both of which are commercially available from PPG Industries, Pittsburgh, Pa.

In accordance with certain methods of the present invention, as is apparent from FIGS. 1A and 1B at step 200, the solid silica powder is contacted with a carrier. The carrier may be a gas that acts to suspend the solid silica powder in the gas, thereby producing a gas-stream suspension of the solid silica powder. Suitable carrier gases include, but are not limited to, argon, helium, nitrogen, oxygen, air, hydrogen, or a combination thereof.

Next, in accordance with certain methods of the present invention, the powder is heated, at step 300, by means of a plasma as the powder flows through the plasma chamber, yielding a gaseous product stream. In certain embodiments, the powder is heated to a temperature ranging from 2,500° to 20,000° C., such as 1,700° to 8,000° C.

In certain embodiments, the gaseous product stream may be contacted with a reactant, such as a hydrogen-containing material, that may be injected into the plasma chamber, as indicated at step 350. The particular material used as the reactant is not limited, so long as it contains hydrogen and results, in certain embodiments, in the formation of isolated hydroxyl groups on the surface of the resulting ultrafine silica particles, as discussed earlier. Suitable reactant materials include, but are not limited to, air, water vapor, hydrogen gas, ammonia, and/or hydrocarbons.

As is apparent from FIG. 1A, in certain methods of the present invention, after the gaseous product stream is produced, it is, at step 400, contacted with a plurality of quench streams that are injected into the plasma chamber through a plurality of quench stream injection ports, wherein the quench streams are injected at flow rates and injection angles that result in impingement of the quench streams with each other within the gaseous product stream. The material used in the quench streams is not limited, so long as it adequately cools the gaseous product stream to cause formation of ultrafine silica particles. Thus, as used herein, the term "quench stream" refers to a stream that cools the gaseous product stream to such an extent so as to cause formation of ultrafine silica particles. In certain embodiments, the quench stream material is selected so as to result in the formation of ultrafine silica particles having isolated hydroxyl groups as described above. Therefore, in some cases, the quench streams comprise a hydrogen-containing material that, in the high temperature conditions existing in the plasma chamber, will dissociate to release free hydrogen. Materials suitable for use in the quench streams include, but are not limited to, hydrogen gas, carbon dioxide, air, water vapor, ammonia, mono, di and polybasic alcohols, and/or hydrocarbons.

The particular flow rates and injection angles of the various quench streams may vary, so long as they impinge with each other within the gaseous product stream to result in the rapid cooling of the gaseous product stream to produce ultrafine silica particles. This differentiates the present invention from certain fast quench plasma systems that primarily or exclusively utilize Joule-Thompson adiabatic and isoentropic expansion through, for example, the use of a converging-diverging nozzle or a "virtual" converging-diverging nozzle, to form ultrafine particles. In certain embodiments of the present invention, the gaseous product stream is contacted with the quench streams to produce ultrafine silica particles before passing those particles through a converging member, such as, for example, a converging-diverging nozzle, which the inventors have surprisingly discovered aids in, inter alia, reducing the fouling or clogging of the plasma chamber, thereby enabling the production of ultrafine silica particles from solid silica powder without frequent disruptions in the production process for cleaning of the plasma system. In the present invention, the quench streams primarily cool the gaseous product stream through dilution, rather than adiabatic expansion, thereby causing a rapid quenching of the gaseous product stream and the formation of ultrafine silica particles prior to passing the particles into and through a converging member, such as a converging-diverging nozzle.

As used herein, the term "converging member" refers to a device that includes at least a section or portion that progresses from a larger diameter to a smaller diameter in the direction of flow, thereby restricting passage of a flow therethrough, which can permit control of the residence time of the flow in the plasma chamber due to a pressure differential upstream and downstream of the converging member. In certain embodiments, the converging member comprises a converging-diverging nozzle of the type described in U.S. Pat. No. RE37,853 at col. 9, line 65 to col. 11, line 32, the cited portion of which being incorporated by reference herein.

Referring again to FIG. 1A, it is seen that, in certain embodiments, after contacting the gaseous product stream with the quench streams to cause production of ultrafine silica particles, the ultrafine silica particles are, at step 500, passed through a converging member, whereas in other embodiments, as illustrated in FIG. 1B, the gaseous product stream is passed through a converging member at step 450 prior to contacting the stream with the quench streams to cause production of ultrafine silica particles at step 550. In either of these embodiments, while the converging member may act to cool the product stream to some degree, the quench streams perform much of the cooling so that the ultrafine silica particles are primarily formed upstream of the converging member in the embodiment illustrated by FIG. 1A or downstream of the converging member in the embodiment illustrated by FIG. 1B. Moreover, in either of these embodiments, the converging member may primarily act as a choke position that permits operation of the reactor at higher pressures, thereby increasing the residence time of the materials therein. The combination of quench stream dilution cooling with a converging member appears to provide a commercially viable method of producing ultrafine silica particles from solid silica powder using a plasma system, since, for example, (i) a solid feed material can be used effectively without heating the feed material to a gaseous or liquid state before injection into the plasma, and (ii) fouling of the plasma system can be minimized, or eliminated, thereby reducing or eliminating disruptions in the production process for cleaning of the system.

As is seen in FIGS. 1A and 1B, in certain embodiments of the methods of the present invention, after the ultrafine silica particles are produced, they are collected at step 600. Any suitable means may be used to separate the ultrafine silica particles from the gas flow, such as, for example, a bag filter or cyclone separator.

Figure 2A:
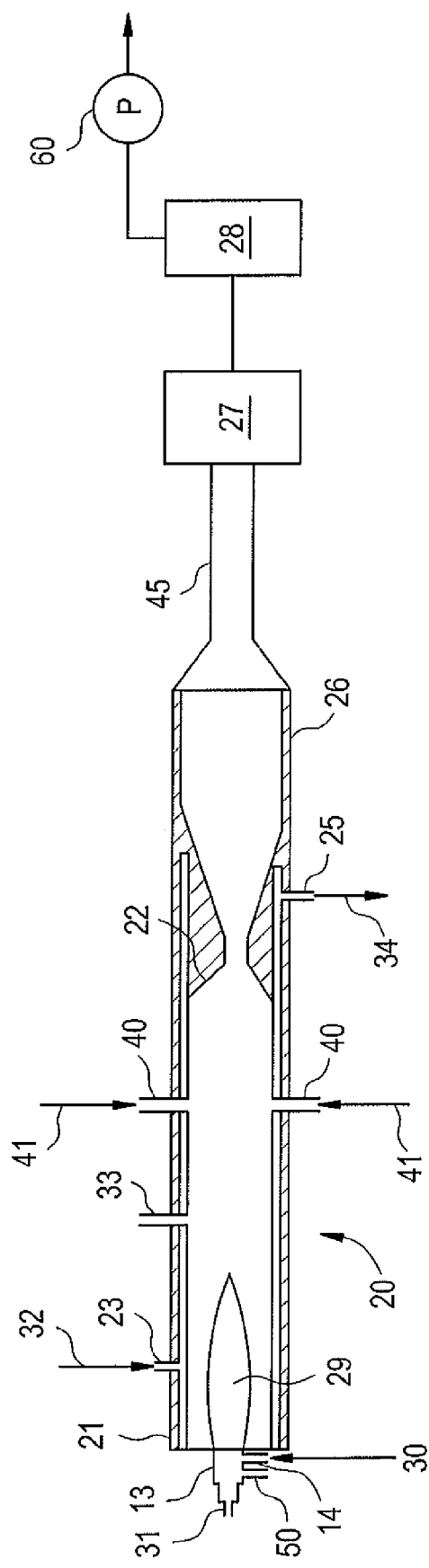
FIGS. 2A and 2B are schematic views of an apparatus for producing ultrafine silica particles in accordance with certain embodiments of the present invention.
Figure 2B:
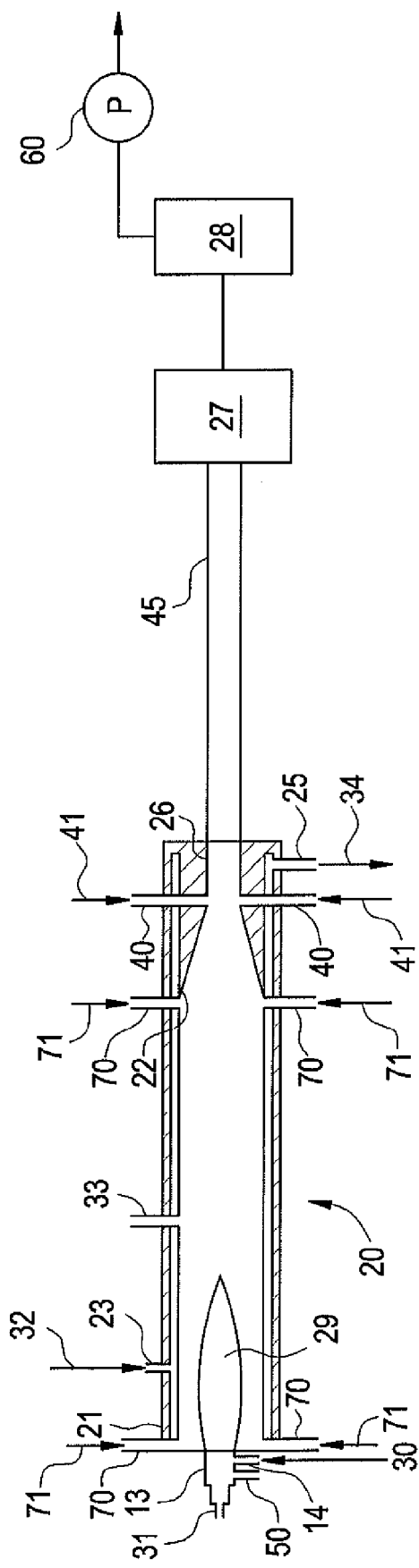

Now referring to FIGS. 2A and 2B, there are depicted schematic diagrams of apparatus for producing ultrafine silica particles in accordance with certain embodiments of the present invention. As is apparent, a plasma chamber 20 is provided that includes a solid silica particle feed inlet 50. Also provided is at least one carrier gas feed inlet 14, through which a carrier gas flows in the direction of arrow 30 into the plasma chamber 20. As previously indicated, the carrier gas acts to suspend the powder in the gas, thereby producing a gas-stream suspension of the solid silica powder which flows towards plasma 29. Numerals 23 and 25 designate cooling inlet and outlet respectively, which may be present for a double-walled plasma chamber 20. In these embodiments, coolant flow is indicated by arrows 32 and 34. Suitable coolants include both liquids and gases depending upon the selected reactor geometry and materials of construction.

In the embodiments depicted by FIGS. 2A and 2B, a plasma torch 21 is provided. Torch 21 thermally decomposes the incoming gas-stream suspension of solid silica powder within the resulting plasma 29 as the stream is delivered through the inlet of the plasma chamber 20, thereby producing a gaseous product stream. As is seen in FIGS. 2A and 2B, the solid silica particles are, in certain embodiments, injected downstream of the location where the arc attaches to the annular anode 13 of the plasma generator or torch.

A plasma is a high temperature luminous gas which is at least partially (1 to 100%) ionized. A plasma is made up of gas atoms, gas ions, and electrons. A thermal plasma can be created by passing a gas through an electric arc. The electric arc will rapidly heat the gas by resistive and radiative heating to very high temperatures within microseconds of passing through the arc. The plasma is often luminous at temperatures above 9000 K.

A plasma can be produced with any of a variety of gases. This can give excellent control over any chemical reactions taking place in the plasma as the gas may be inert, such as argon, helium, or neon, reductive, such as hydrogen, methane, ammonia, and carbon monoxide, or oxidative, such as oxygen, nitrogen, and carbon dioxide. Air, oxygen, and/or oxygen/argon gas mixtures are often used to produce ultrafine silica particles in accordance with the present invention. In FIGS. 2A and 2B, the plasma gas feed inlet is depicted at 31.

As the gaseous product stream exits the plasma 29 it proceeds towards the outlet of the plasma chamber 20. As is apparent, a reactant, as described earlier, can be injected into the reaction chamber prior to the injection of the quench streams. A supply inlet for the reactant is shown in FIGS. 2A and 2B at 33.

As is seen in FIGS. 2A and 2B, in certain embodiments of the present invention, the gaseous product stream is contacted with a plurality of quench streams which enter the plasma chamber 20 in the direction of arrows 41 through a plurality of quench stream injection ports 40 located along the circumference of the plasma chamber 20. As previously indicated, the particular flow rate and injection angle of the quench streams is not limited so long as they result in impingement of the quench streams 41 with each other within the gaseous product stream, in some cases at or near the center of the gaseous product stream, to result in the rapid cooling of the gaseous product stream to produce ultrafine silica particles. This results in a quenching of the gaseous product stream through dilution to form ultrafine silica particles.

Figure 3:
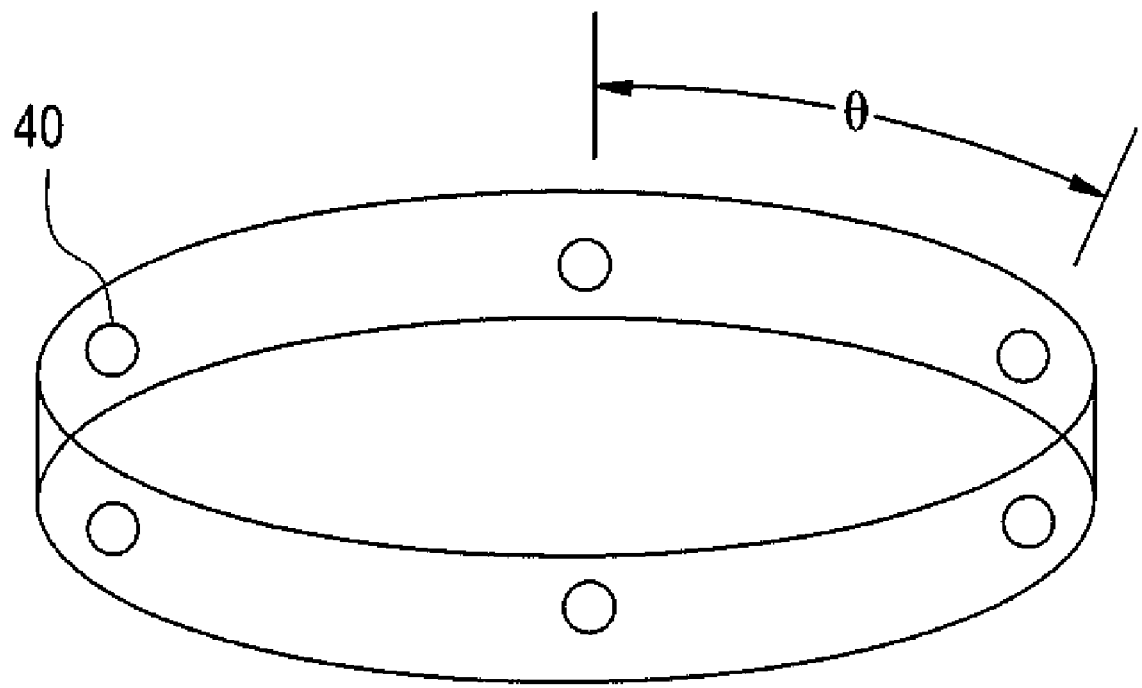
FIG. 3 is a detailed perspective view of a plurality of quench stream injection ports in accordance with certain embodiments of the present invention.

Referring now to FIG. 3, there is depicted a perspective view of a plurality of quench stream injection ports 40 in accordance with certain embodiments of the present invention. In this particular embodiment, six (6) quench stream injection ports are depicted, wherein each port is disposed at an angle "θ" apart from each other along the circumference of the reactor chamber 20. It will be appreciated that "θ" may have the same or a different value from port to port. In certain embodiments of the present invention, at least four (4) quench stream injection ports 40 are provided, in some cases at least six (6) quench stream injection ports are present or, in other embodiments, twelve (12) or more quench stream injection ports are present. In certain embodiments, each angle "θ" has a value of no more than 90°. In certain embodiments, the quench streams are injected into the plasma chamber normal (90° angle) to the flow of the gaseous reaction product. In some cases, however, positive or negative deviations from the 90° angle by as much as 30° may be used.

In certain embodiments of the present invention, particularly in those embodiments wherein the quench streams are injected downstream of the converging member, such as is depicted in FIG. 2B, one or more sheath streams are injected into the plasma chamber upstream of the converging member. As used herein, the term "sheath stream" refers to a stream of gas and/or vapor that is injected prior to the converging member and which is injected at flow rate(s) and injection angle(s) that result in a barrier separating the gaseous product stream from the plasma chamber walls, including the converging portion of the converging member. The material used in the sheath stream(s) is not limited, so long as the stream(s) act as a barrier between the gaseous product stream and the plasma chamber walls, including the converging member, thereby preventing, to at least a large degree, material from sticking to the plasma chamber walls, including the walls of the converging member. For example, materials suitable for use in the sheath stream(s) include, but are not limited to, those materials described earlier with respect to the quench streams. A supply inlet for the sheath stream(s) are shown in FIG. 2B at 70 and the direction of flow is indicated by numeral 71.

By proper selection of the converging member dimensions, the plasma chamber 20 can be operated at atmospheric pressure, or slightly less than atmospheric pressure, or, in some cases, at a pressurized condition, to achieve the desired residence time, while the chamber 26 downstream of the converging member 22 is maintained at a vacuum pressure by operation of a vacuum producing device, such as a vacuum pump 60. Following production of the ultrafine silica particles, they may then enter a cool down chamber 26.

As is apparent from FIGS. 2A and 2B, in certain embodiments of the present invention, the ultrafine silica particles may flow from cool down chamber 26 to a collection station 27 via a cooling section 45, which may comprise, for example, a jacketed cooling tube. In certain embodiments, the collection station 27 comprises a bag filter or other collection means. A downstream scrubber 28 may be used if desired to condense and collect material within the flow prior to the flow entering vacuum pump 60.

In certain embodiments, the residence times for materials within the plasma chamber 20 are on the order of milliseconds. The solid silica powder may be injected under pressure (such as greater than 1 to 100 atmospheres) through a small orifice to achieve sufficient velocity to penetrate and mix with the plasma. In addition, in many cases the injected stream of solid silica powder is injected normal (90° angle) to the flow of the plasma gases. In some cases, positive or negative deviations from the 90° angle by as much as 30° may be desired.

The high temperature of the plasma rapidly vaporizes the solid silica powder. There can be a substantial difference in temperature gradients and gaseous flow patterns along the length of the plasma chamber 20. It is believed that, at the plasma arc inlet, flow is turbulent and there is a high temperature gradient; from temperatures of about 20,000 K at the axis of the chamber to about 375 K at the chamber walls.

The plasma chamber is often constructed of water cooled stainless steel, nickel, titanium, copper, aluminum, or other suitable materials. The plasma chamber can also be constructed of ceramic materials to withstand a vigorous chemical and thermal environment.

The plasma chamber walls may be internally heated by a combination of radiation, convection and conduction. In certain embodiments, cooling of the plasma chamber walls prevents unwanted melting and/or corrosion at their surfaces. The system used to control such cooling should maintain the walls at as high a temperature as can be permitted by the selected wall material, which often is inert to the materials within the plasma chamber at the expected wall temperatures. This is true also with regard to the nozzle walls, which may be subjected to heat by convection and conduction.

The length of the plasma chamber is often determined experimentally by first using an elongated tube within which the user can locate the target threshold temperature. The plasma chamber can then be designed long enough so that the materials have sufficient residence time at the high temperature to reach an equilibrium state and complete the formation of the desired end products.

The inside diameter of the plasma chamber 20 may be determined by the fluid properties of the plasma and moving gaseous stream. In certain embodiments, the inside diameter of the plasma chamber is sufficiently great to permit necessary gaseous flow, but not so large that recirculating eddys or stagnant zones are formed along the walls of the chamber. Such detrimental flow patterns can cool the gases prematurely and precipitate unwanted products. In many cases, the inside diameter of the plasma chamber 20 is more than 100% of the plasma diameter at the inlet end of the plasma chamber.

The inventors have surprisingly discovered that the methods and apparatus of the present invention, which utilize quench stream dilution cooling in combination with a converging member, such as, in some cases, a converging-diverging nozzle of the type described earlier, has several benefits. First, such a combination allows for the use of sufficient residence times of the materials within the plasma system that make the use of solid silica powder feed materials practical. Second, fouling of the plasma chamber can be minimized, particularly in those embodiments wherein at least one sheath stream is used as described earlier, since the amount of material sticking to the interior surface of the converging member is reduced or, in some cases, eliminated. Third, the combination used in the present invention allows for the collection of ultrafine silica powder at a single collection point, such as a filter bag, with a minimal amount of ultrafine silica particles being deposited within the cooling chamber or cooling section described earlier.

As should be appreciated from the foregoing description, the present invention is also directed to ultrafine silica particles, such as ultrafine silica particles that have isolated hydroxyl groups as previously described, wherein the particles are produced from a solid silica powder feed material.

The present invention is also directed to coating compositions comprising ultrafine silica particles produced from a solid silica powder feed material using a method and/or apparatus of the present invention. In certain embodiments, the ultrafine silica particles are present in the coating compositions of the present invention in an amount of 3 to 50 percent by volume, such as 8 to 30 percent by volume, or, in certain embodiments, 10 to 18 percent by volume, wherein the volume percents are based on the total volume of the coating composition.

In certain embodiments, the coating compositions of the present invention comprise a film-forming resin. As used herein, the term "film-forming resin" refers to resins that can form a self-supporting continuous film on at least a horizontal surface of a substrate upon removal of any diluents or carriers present in the composition or upon curing at ambient or elevated temperature.

Film-forming resins that may be used in the coating compositions of the present invention include, without limitation, those used in automotive OEM coating compositions, automotive refinish coating compositions, industrial coating compositions, architectural coating compositions, coil coating compositions, and aerospace coating compositions, among others.

In certain embodiments, the film-forming resin included within the coating compositions of the present invention comprises a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting resin will not melt upon the application of heat and is insoluble in solvents. In other embodiments, the film-forming resin included within the coating compositions of the present invention comprises a thermoplastic resin. As used herein, the term "thermoplastic" refers to resins that comprise polymeric components that are not joined by covalent bonds and thereby can undergo liquid flow upon heating and are soluble in solvents. See Saunders, K. J., Organic Polymer Chemistry, pp. 41-42, Chapman and Hall, London (1973).

Film-forming resins suitable for use in the coating compositions of the present invention include, for example, those formed from the reaction of a polymer having at least one type of reactive group and a curing agent having reactive groups reactive with the reactive group(s) of the polymer. As used herein, the term "polymer" is meant to encompass oligomers, and includes, without limitation, both homopolymers and copolymers. The polymers can be, for example, acrylic, saturated or unsaturated polyester, polyurethane or polyether, polyvinyl, cellulosic, acrylate, silicon-based polymers, copolymers thereof, and mixtures thereof, and can contain reactive groups such as epoxy, carboxylic acid, hydroxyl, isocyanate, amide, carbamate and carboxylate groups, among others, including mixtures thereof.

Suitable acrylic polymers include, for example, those described in United States Patent Application Publication 2003/0158316 A1 at [0030]-[0039], the cited portion of which being incorporated herein by reference. Suitable polyester polymers include, for example, those described in United States Patent Application Publication 2003/0158316 A1 at [0040]-[0046], the cited portion of which being incorporated herein by reference. Suitable polyurethane polymers include, for example, those described in United States Patent Application Publication 2003/0158316 A1 at [0047]-[0052], the cited portion of which being incorporated herein by reference. Suitable silicon-based polymers are defined in U.S. Pat. No. 6,623,791 at col. 9, lines 5-10, the cited portion of which being incorporated herein by reference.

As indicated earlier, certain coating compositions of the present invention can include a film-forming resin that is formed from the use of a curing agent. As used herein, the term "curing agent" refers to a material that promotes "cure" of composition components. As used herein, the term "cure" means that any crosslinkable components of the composition are at least partially crosslinked. In certain embodiments, the crosslink density of the crosslinkable components, i.e., the degree of crosslinking, ranges from 5 percent to 100 percent of complete crosslinking, such as 35 percent to 85 percent of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer, as is described in U.S. Pat. No. 6,803,408, at col. 7, line 66 to col. 8, line 18, the cited portion of which being incorporated herein by reference.

Any of a variety of curing agents known to those skilled in the art may be used. For example exemplary suitable aminoplast and phenoplast resins are described in U.S. Pat. No. 3,919,351 at col. 5, line 22 to col. 6, line 25, the cited portion of which being incorporated herein by reference. Exemplary suitable polyisocyanates and blocked isocyanates are described in U.S. Pat. No. 4,546,045 at col. 5, lines 16 to 38; and in U.S. Pat. No. 5,468,802 at col. 3, lines 48 to 60, the cited portions of which being incorporated herein by reference. Exemplary suitable anhydrides are described in U.S. Pat. No. 4,798,746 at col. 10, lines 16 to 50; and in U.S. Pat. No. 4,732,790 at col. 3, lines 41 to 57, the cited portions of which being incorporated herein by reference. Exemplary suitable polyepoxides are described in U.S. Pat. No. 4,681,811 at col. 5, lines 33 to 58, the cited portion of which being incorporated herein by reference. Exemplary suitable polyacids are described in U.S. Pat. No. 4,681,811 at col. 6, line 45 to col. 9, line 54, the cited portion of which being incorporated herein by reference. Exemplary suitable polyols are described in U.S. Pat. No. 4,046,729 at col. 7, line 52 to col. 8, line 9; col. 8, line 29 to col. 9, line 66; and in U.S. Pat. No. 3,919,315 at col. 2, line 64 to col. 3, line 33, the cited portions of which being incorporated herein by reference. Examples suitable polyamines described in U.S. Pat. No. 4,046,729 at col. 6, line 61 to col. 7, line 26, and in U.S. Pat. No. 3,799,854 at column 3, lines 13 to 50, the cited portions of which being incorporated herein by reference. Appropriate mixtures of curing agents, such as those described above, may be used.

In certain embodiments, the coating compositions of the present invention are formulated as a one-component composition where a curing agent is admixed with other composition components to form a storage stable composition. In other embodiments, compositions of the present invention can be formulated as a two-component composition where a curing agent is added to a pre-formed admixture of the other composition components just prior to application.

In certain embodiments, the film-forming resin is present in the coating compositions of the present invention in an amount greater than 30 weight percent, such as 40 to 90 weight percent, or, in some cases, 50 to 90 weight percent, with weight percent being based on the total weight of the coating composition. When a curing agent is used, it may, in certain embodiments, be present in an amount of up to 70 weight percent, such as 10 to 70 weight percent; this weight percent is also based on the total weight of the coating composition.

In certain embodiments, the coating compositions of the present invention are in the form of liquid coating compositions, examples of which include aqueous and solvent-based coating compositions and electrodepositable coating compositions. The coating compositions of the present invention may also be in the form of a co-reactable solid in particulate form, i.e., a powder coating composition. Regardless of the form, the coating compositions of the present invention may be pigmented or clear, and may be used alone or in combination as primers, basecoats, or topcoats.

In certain embodiments, the coating compositions of the present invention may also comprise additional optional ingredients, such as those ingredients well known in the art of formulating surface coatings. Such optional ingredients may comprise, for example, surface active agents, flow control agents, thixotropic agents, fillers, anti-gassing agents, organic co-solvents, catalysts, antioxidants, light stabilizers, UV absorbers and other customary auxiliaries. Any such additives known in the art can be used, absent compatibility problems. Non-limiting examples of these materials and suitable amounts include those described in U.S. Pat. Nos. 4,220,679; 4,403,003; 4,147,769; and 5,071,904.

In certain embodiments, the coating compositions of the present invention also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions In certain embodiments, the coating compositions of the present invention also comprise conventional corrosion resisting particles. Suitable corrosion resisting particles include, but are not limited to, iron phosphate, zinc phosphate, calcium ion-exchanged silica, colloidal silica, synthetic amorphous silica, and molybdates, such as calcium molybdate, zinc molybdate, barium molybdate, strontium molybdate, and mixtures thereof. Suitable calcium ion-exchanged silica is commercially available from W. R. Grace & Co. as SHIELDEX® AC3 and/or SHIELDEX® C303. Suitable amorphous silica is available from W. R. Grace & Co. under the tradename SYLOID®. Suitable zinc hydroxyl phosphate is commercially available from Elementis Specialties, Inc. under the tradename NALZIN® 2.

These conventional non-chrome corrosion resisting particles typically have a particle size of approximately one micron or larger. In certain embodiments, these particles are present in the coating compositions of the present invention in an amount ranging from 5 to 40 percent by weight, such as 10 to 25 percent by weight, with the percents by weight being based on the total solids weight of the composition.

In certain embodiments, the coating compositions of the present invention may comprise corrosion resisting particles selected from (i) particles having a calculated equivalent spherical diameter of no more than 200 nanometers and comprising one or more inorganic oxides, wherein at least one oxide comprises zinc, cerium, yttrium, manganese, magnesium, molybdenum, lithium, aluminum, magnesium, or calcium, (ii) particles comprising an inorganic oxide network comprising a plurality of inorganic materials, (iii) particles comprising a clay treated with a lanthanide and/or transition metal salt, and/or (iv) particles comprising an inorganic oxide in combination with a buffering agent. Such materials are described in copending U.S. patent application Ser. No. 11/213,136, the relevant disclosure of which is incorporated by reference herein.

The coating compositions of the present invention may be prepared by any of a variety of methods. Coating compositions of the present invention can be prepared by first blending a film-forming resin, the ultrafine silica particles, and a diluent, such as an organic solvent and/or water, in a closed container that contains ceramic grind media. The blend is subjected to high shear stress conditions, such as by shaking the blend on a high speed shaker, until a homogeneous dispersion of particles remains suspended in the film-forming resin with no visible particle settle in the container. If desired, any mode of applying stress to the blend can be utilized, so long as sufficient stress is applied to achieve a stable dispersion of the particles in the film-forming resin.

The ultrafine silica particles produced in accordance with the present invention are often particularly suitable for use in sound transmission inhibiting coating compositions. Such compositions often comprise an aqueous dispersion of polymeric microparticles prepared, for example, from components comprising (i) a nitrile, amide, and/or carbamate functional material, and (ii) a polyoxyalkylene acrylate, such as is described in U.S. Pat. No. 6,531,541 at col. 3, line 49 to col. 11, line 65, the cited portion of which being incorporated by reference herein. As a result, the present invention is also directed to sound transmission inhibiting coating compositions comprising ultrafine silica particles produced by an apparatus and/or method of the present invention. In addition, the present invention is directed to methods for reducing or eliminating the amount of fumed silica in such compositions. Such methods comprising replacing at least some, if not all, of the fumed silica in the composition with ultrafine silica particles produced in accordance with the present invention.

The coating compositions of the present invention may be applied to a substrate by known application techniques, such as dipping or immersion, spraying, intermittent spraying, dipping followed by spraying, spraying followed by dipping, brushing, or by roll-coating. Usual spray techniques and equipment for air spraying and electrostatic spraying, either manual or automatic methods, can be used. While the coating compositions of the present invention can be applied to various substrates, such as wood, metal, glass, cloth, plastic, foam, including elastomeric substrates and the like, in many cases, the substrate comprises a metal.

In certain embodiments of the coating compositions of the present invention, after application of the composition to the substrate, a film is formed on the surface of the substrate by driving solvent, i.e., organic solvent and/or water, out of the film by heating or by an air-drying period. Suitable drying conditions will depend on the particular composition and/or application, but in some instances a drying time of from about 1 to 5 minutes at a temperature of about 80 to 250° F. (20 to 121° C.) will be sufficient. More than one coating layer may be applied if desired. Usually between coats, the previously applied coat is flashed; that is, exposed to ambient conditions for about 10 to 30 minutes. In certain embodiments, the thickness of the coating is from 0.05 to 5 mils (1.3 to 127 microns), such as 0.05 to 3.0 mils (1.3 to 76.2 microns). The coating composition may then be heated. In the curing operation, solvents are driven off and the crosslinkable components of the composition, if any, are crosslinked. The heating and curing operation is sometimes carried out at a temperature in the range of from 160 to 350° F. (71 to 177° C.) but, if needed, lower or higher temperatures may be used.

The present invention is also directed to multi-component composite coatings comprising at least one coating layer deposited from a coating composition of the present invention. In certain embodiments, the multi-component composite coating compositions of the present invention comprise a base-coat film-forming composition serving as a basecoat (often a pigmented color coat) and a film-forming composition applied over the basecoat serving as a topcoat (often a transparent or clear coat).

In these embodiments of the present invention, the coating composition from which the basecoat and/or topcoat is deposited may comprise, for example, any of the conventional basecoat coating compositions known to those skilled in the art of, for example, formulating automotive OEM coating compositions, automotive refinish coating compositions, industrial coating compositions, architectural coating compositions, coil coating compositions, and aerospace coating compositions, among others. Such compositions typically include a film-forming resin that may include, for example, an acrylic polymer, a polyester, and/or a polyurethane. Exemplary film-forming resins are disclosed in U.S. Pat. No. 4,220,679, at col. 2 line 24 to col. 4, line 40; as well as U.S. Pat. No. 4,403,003, U.S. Pat. No. 4,147,679 and U.S. Pat. No. 5,071,904.

The present invention is also directed to substrates, such as metal substrates, at least partially coated with a coating composition of the present invention as well as substrates, such as metal substrates, at least partially coated with a multi-component composite coating of the present invention. In other respects, the present invention is directed to a method for replacing or reducing the amount of fumed silica in a coating composition. The method comprises replacing at least some of the fumed silica with ultrafine silica particles comprising isolated hydroxyl groups of the type describe herein.

Illustrating the invention are the following examples that are not to be considered as limiting the invention to their details. All parts and percentages in the examples, as well as throughout the specification, are by weight unless otherwise indicated.

PARTICLE EXAMPLE 1

Particles from solid precursors were prepared using a DC thermal plasma reactor system of including a converging-diverging nozzle of the type generally described in U.S. Pat. No. RE37,853 E. The main reactor system included a DC plasma torch (Model SG-100 Plasma Spray Gun commercially available from Praxair Technology, Inc., Danbury, Connecticut) operated with 60 standard liters per minute of argon carrier gas and 25 kilowatts of power delivered to the torch. A solid reactant (precipitated silica, WB-10 grade, available from PPG Industries) was fed to the reactor at a rate of 1.5 to 2 grams per minute through a gas assistant powder feeder (Model 1264, commercially available from Praxair Technology, Inc., Danbury, Connecticut) located at the plasma torch outlet. At the powder feeder, about 4 standard liters per minute argon were used as carrier gas. Oxygen at 10 standard liters per minute was delivered through two ⅛ inch diameter nozzles located 180° apart at 0.69" downstream of the powder injector port. Following a 9.7 inch long reactor section, a quench system was provided that included a quench gas injection port that included 6⅛ inch diameter nozzles located 60° apart radially and a 7 millimeter diameter converging-diverging nozzle located 3 inches downstream of the quench gas injection port. Quench air was injected at the quench gas injection port at a rate of 100 standard liters per minute.

Using these run conditions, the measured B.E.T. specific surface area of the resulting ultrafine silica particles was 522 square meters per gram using the Gemini model 2360 analyzer and the calculated equivalent spherical diameter was 5 nanometers.

PARTICLE EXAMPLE 2

Particles from silica solid reactant was prepared using the same apparatus and operating conditions as Particle Example 1, except that the plasma power input was 24 kilowatts and the reactor length was 7.7 inches.

Using these conditions, the measured B.E.T. specific surface area of the resulting ultrafine silica particles was 380 square meters per gram using the Gemini model 2360 analyzer and the calculated equivalent spherical diameter was 7 nanometers.

PARTICLE EXAMPLE 3

Particles from silica solid reactant was prepared using the same apparatus and operating conditions as Particle Example 1, except that the reactor length was 13.7 inches and the quench air was injected at the quench gas injection port at a rate of 60 standard liters per minute.

Using these run conditions, the measured B.E.T. specific surface area of the resulting ultrafine silica particles was 293 square meters per gram using the Gemini model 2360 analyzer and the calculated equivalent spherical diameter was 9 nanometers.

PARTICLE EXAMPLE 4

Particles from silica solid reactant was prepared using the same apparatus and operating conditions as Particle Example 1, except that the plasma power input was 20 kilowatts, the converging-diverging nozzle size was 10 millimeters, and the quench air was injected at the quench gas injection port at a rate of 15 standard liters per minute.

Using these run conditions, the measured B.E.T. specific surface area of the resulting ultrafine silica particles was 230 square meters per gram using the Gemini model 2360 analyzer and the calculated equivalent spherical diameter was 12 nanometers.

COATING COMPOSITION EXAMPLES A TO E

Coating compositions were prepared using the components and weights (in grams) shown in Table 1. Coatings were prepared by adding components 1 to 7 to a suitable vessel under centrifugal agitation at 1800 rpm for 90 seconds. Components 8 to 11 were then added to the vessels containing components 1 to 7. Additional 60 seconds of centrifugal agitation at 1800 rpm was performed to ensure uniform mixing of all components. Each sample was placed in a vacuum chamber equipped with an agitator, and a vacuum at least 700 mm Hg applied with the agitator turning the material for 2 minutes. The sample was removed when foaming subsided (about 3 to 5 minutes).

TABLE 1

| Component | Material | Example A | Example B | Example C | Example D | Example E |
|---|---|---|---|---|---|---|
| 1 | Resin[1] | 74.4 | 74.4 | 74.4 | 74.4 | 74.4 |
| 2 | De-ionic water | 3.2 | 3.2 | 3.2 | 3.2 | 3.2 |
| 3 | PM-210[2] | 1.4 | 1.4 | 1.4 | 1.4 | 1.4 |
| 4 | Foammaster 111[3] | 0.1 | 0.1 | 0.1 | 0.1 | 0.1 |
| 5 | Aquablak 245[4] | 1.4 | 1.4 | 1.4 | 1.4 | 1.4 |
| 6 | Dolocorn 4512[5] | 129.7 | 129.7 | 129.7 | 129.7 | 129.7 |
| 7 | Dolofil 4085[6] | 64.9 | 64.9 | 64.9 | 64.9 | 64.9 |
| 8 | FTALON 1670/80 ABT[7] | 0.7 | 0.7 | 0.7 | 0.7 | 0.7 |
| 9 | PM-495[8] | 3.2 | 3.2 | 3.2 | 3.2 | 3.2 |
| 10 | W-SPT[9] | 2.3 | 2.3 | 2.3 | 2.3 | 2.3 |
| 11 | Cab-O-Sil M5[10] | 1.1 | | | | |
| | Example 1 particle | | 1.1 | | | |
| | Example 2 particle | | | 1.1 | | |
| | Example 3 particle | | | | 1.1 | |
| | Example 4 particle | | | | | 1.1 |

[1]Acrylate resin with composition as listed in Table 1, Sample 3 in US Pat. 6,531,541 B1.
[2]Sodium salt of polymerized alky with 67% water, commercially available from R. T. Vanderbilt Company, Inc., Norwalk, CT.
[3]Hydrocarbon defoamer, commercially available from Cognis, Canada.
[4]Carbon black emulsion, commercially available from Solution Dispersions Inc., Cynthiana, KY.
[5]Dolomite calcium magnesium carbonate, commercially available from Specialty Minerals, Inc., Bethlehem, PA.
[6]Dolomite calcium magnesium carbonate, commercially available from Specialty Minerals, Inc. Bethlehem, PA.
[7]Hydroxylated polyester resin oil, commercially available from Galstaff Multiresine SpA, Mornago, Italy.
[8]10% Bentonne EW in water, commercially available from Elementis Specialties, Inc., Hightstown, NJ.
[9]Stearic acid coated CaCO3, commercially available from Solvay &Cie, Brussels, Belgium.
[10]Fumed silica, M5 grade, commercially available from Cabot Corporation, Boston, MA.

The coating compositions of Table 1 were placed in 2.5 oz glass gars. Viscosity was measured using a Brookfield viscometer (RVF model, commercially available from Brookfield Engineering Laboratories, Inc., Middleboro, Mass.) at 77° F. room conditions. Table 2 shows viscosity data measured at various time intervals, including as prepared, 1 day, 3 days, and 7 days later. Higher viscosity indicated better additives of the particles.

TABLE 2

| Viscosity[11] (×1000 CPS) | Initial | 1 day | 3 days | 7 days |
|---|---|---|---|---|
| Example A | 28 | 28 | 28 | 31 |
| Example B | 33 | 33 | 36 | 33 |
| Example C | 32 | 33 | 34 | 32 |
| Example D | Turned to solid[12] | Turned to solid | Turned to solid | Turned to solid |
| Example E | 25 | 26 | 25 | 25 |

[11]#7 Spindle was used at 20 rpm.
[12]Sample D turned to solid with viscosity too high to be measured.

The coating materials of Table 1 were applied to the galvanized test substrates (APR26917, ACT Laboratories, Hillsadle, Mich.) using a draw down bar. Each composition was applied to form a 0.2 inch (5.08 mm) coating layer with 4 inch by 4 inch size on the top portion of the panel. Sag performance was measured using a Mitsubishi Standard (ES-X62315). The shift distance of the coating layer was measured under different conditions. Results are illustrated in Table 3. Smaller shift distance indicated better rheology property provided by the particles.

TABLE 3

| | Sag[13] (mm shift) | Drop Sag[14] (mm shift) | Sag after Baking[15] (mm shift) |
|---|---|---|---|
| Example A | 30 | 5 | 0 |
| Example B | 5 | 2 | 0 |
| Example C | 17 | 2 | 1 |
| Example D | Turned to solid[16] | Turned to solid | Turned to solid |
| Example E | 39 | 5 | 3 |

[13]Measured 2 minutes after the panel is placed vertically.
[14]The panel was dropped down vertically from 2.5 cm height to a table. The additional shift distance is measured.
[15]Panels were placed on a stand 85 degree vertically, and placed in an electric oven at 284° F. for 20 minutes. The additional shift distance is measured.
[16]The coating material turned to solid, and was not able to measure its sag performance.

PARTICLE EXAMPLE 5

A computer simulation of a plasma reactor system comprising an insulated reactor, sheath gas injection along the reactor wall, and quenching stream injection downstream of a converging member was performed to show that ultrafine particles can be produced from solid precursors. In the simulation, the main reactor system included a DC plasma torch operated with 60 standard liters per minute of argon carrier gas and 13 kilowatts of power delivered to the reactor. For the simulation, silica powder with an average particle size of 25 microns was fed to the reactor at a rate of 2.5 grams per minute through a gas assistant powder feeder located at the plasma torch outlet. At the powder feeder, about 4 standard liters per minute argon was used as carrier gas. For the simulation, oxygen reactant was injected at 10 standard liters per minute through two ⅛ inch diameter nozzles located 180° apart at 0.69 inches downstream of the powder injection port and sheath air was injected using various swirl orientations through both: (1) three ¼ inch diameter nozzles located 120° apart at the inlet end of the cylindrical reactor section at a rate of 100 standard liters per minute; and (2) twelve ⅛ inch diameter nozzles located 30° apart at the beginning of the conical reactor section at a rate of 100 standard liters per minute. Following a 16 inch long cylindrical reactor section and an 8 inch long converging conical reactor section was a gas injection port that include six ⅛ inch diameter nozzles located 60° apart through which quench air was injected at a rate of 100 standard liters per minute.

The temperature distribution and fluid flow behavior in the above described reactor was simulated using the FLUENT® Flow Modeling Software, version 6.2, commercially available from Fluent, Inc., Lebanon, N.H. Using the conditions described above, the simulation results showed that silica particles having an average particle size of 25 microns need about 8 milliseconds of residence time in the high temperature zone of the reactor system for complete vaporization.

Based on the above described computer simulation, it is believed that the construction of a physical embodiment of such a system of the present invention, and the production of ultrafine particles from a solid precursor using such a system, is a matter of mere routine and mechanical application.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A method for making ultrafine silica particles, comprising:
   (a) introducing a solid silica powder into a plasma chamber having an axial flow direction;
   (b) heating the powder by means of a plasma as the powder flows through the plasma chamber, yielding a gaseous product stream;
   (c) contacting the gaseous product stream with a plurality of quench streams injected into the plasma chamber through a plurality of quench stream injection ports, wherein the quench streams are injected at flow rates and injection angles that result in the impingement of the quench streams with each other within the gaseous product stream, thereby producing ultrafine silica particles;
   (d) passing the ultrafine silica particles along the axial flow direction of the plasma chamber through a converging member located within the plasma chamber at an outlet end of the plasma chamber; and
   (e) collecting the ultrafine silica particles, wherein the ultrafine silica particles have an average primary particle size of no more than 50 nanometers.

2. The method of claim 1, wherein the ultrafine silica particles have a B.E.T. specific surface area of 90 to 500 square meters per gram.

3. A method for making ultrafine silica particles, comprising:
   (a) introducing a solid silica powder into a plasma chamber having an axial flow direction;
   (b) heating the powder by means of a plasma as the powder flows through the plasma chamber, yielding a gaseous product stream;
   (c) contacting the gaseous product stream with a plurality of quench streams injected into the plasma chamber through a plurality of quench stream injection ports, wherein the quench streams are injected at flow rates and injection angles that result in the impingement of the quench streams with each other within the gaseous product stream, thereby producing ultrafine silica particles;
   (d) passing the ultrafine silica particles along the axial flow direction of the plasma chamber through a converging member located within the plasma chamber; and
   (e) collecting the ultrafine silica particles, wherein the ultrafine silica particles have an average primary particle size of no more than 20 nanometers.

4. The method of claim 1, wherein the solid silica powder comprises precipitated silica.

5. The method of claim 4, wherein the precipitated silica is in the form of agglomerates having an average size of at least 1 micron.

6. The method of claim 1, wherein the solid silica powder is contacted with a carrier gas prior to heating.

7. The method of claim 1, wherein the converging member comprises a converging-diverging nozzle.

8. The method of claim 1, wherein the plurality of quench stream injection ports comprise at least four quench stream injection ports.

9. The method of claim 1, wherein the plurality of quench stream injection ports are located 60° to 90° apart from each other along the circumference of the plasma chamber.

10. A method for making ultrafine silica particles comprising:
   (a) introducing a solid silica powder into a plasma chamber having an axial flow direction;
   (b) heating the powder by means of a plasma as the powder flows through the plasma chamber, yielding a gaseous product stream;
   (c) passing the gaseous product stream along the axial flow direction of the plasma chamber through a converging member located within the plasma chamber, and then
   (d) contacting the gaseous product stream with a plurality of quench streams injected into the plasma chamber through a plurality of quench stream injection ports, wherein the quench streams are injected at flow rates and injection angles that result in the impingement of the quench streams with each other within the gaseous product stream, thereby producing ultrafine silica particles having an average primary particle size of no more than 20 nanometers.

* * * * *